United States Patent Office 3,649,581
Patented Mar. 14, 1972

3,649,581
STABLE POLYMERIC LATICES OF HIGH CARBOXYL CONTENT
William C. Mast, Stow, and Daniel F. Klemmensen, Akron, Ohio, assignors to The Goodyear Tire & Rubber Company, Akron, Ohio
No Drawing. Continuation-in-part of application Ser. No. 659,894, Aug. 11, 1967. This application Mar. 2, 1970, Ser. No. 15,835
Int. Cl. C08f 45/24
U.S. Cl. 260—29.6 Z  6 Claims

ABSTRACT OF THE DISCLOSURE

Discloses making mechanically stable synthetic polymeric latices comprising at least 55 percent alpha-unsaturated carboxylic monomers such as methacrylic acid polymerized in an emulsion system containing an emulsifier selected from the group consisting of disodium or diammonium nonylphenoxy polyethoxy sulfosuccinate and a sodium or ammonium lauryl polyethoxy sulfate. These emulsifiers permit the formation of a polymeric latex mechanically stable against coagulation while at the same time containing more than 55 percent carboxylic monomers even when the monomeric acid is copolymerized with other copolymerizable monomers such as acrylates, styrene and butadiene.

This application is a continuation-in-part application of copending application Ser. No. 659,894 filed Aug. 11, 1967 and now abandoned.

The present invention relates to an emulsion system for forming mechanically stable polymeric carboxylic latices wherein a sodium or ammonium lauryl polyethoxy sulfate or disodium or diammonium nonylphenoxy polyethoxy sulfosuccinate is used as the emulsifier.

It is desirable to provide polymeric latices having a high carboxylic monomer content ranging from about 55 percent to 95 percent because of the ability of the carboxyl group to form chemical bonds with other groups including hydroxyl found in such fiber as cotton, as well as exert a desirable dirt release action to cotton fabric, thus imparting a desirable property to wash-and-wear fabric made therefrom.

Heretofore, latices having a carboxylic monomer content above 55 percent were unstable in the reactor after partial conversion.

It has now been discovered that a stable latex containing more than 55 percent of a carboxylic monomer can be made in an emulsion system when employing the use of an emulsifier selected from the group consisting of a sodium or ammonium lauryl polyethoxy sulfate having the general formula

wherein M is sodium or ammonium and n is a whole number from 8 to 16 and disodium or diammonium nonylphenoxy polyethoxy sulfosuccinate having the formula

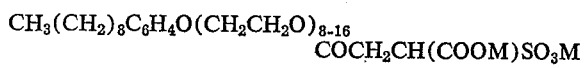

where M is sodium or ammonium.

Polymerizable carboxylic monomers suitable for forming stable polymeric latices containing at least 55 percent carboxylic monomers and containing the $CH_2=C=$ group include methacrylic acid, acrylic acid, fumaric acid, itaconic acid, alpha-styryl acrylic acid, and beta-phenyl acrylic acid (cinnamic acid).

Monomers copolymerizable with the carboxylic monomers heretofore mentioned to produce stable acidic latices are any unsaturated compound which contains a terminal $CH_2=C=$ group can also be used. Of particular interest in this group of monomers are the acrylates including the methyl-, ethyl-, n-propyl-, isopropyl-, n-butyl, isobutyl-, n-amyl-, n-hexyl-, isoheptyl-, n-octyl-, isooctyl-, 6-methylheptyl-, capryl-, n-nonyl-, 3,5,5-trimethyl-, hexyl-, n-decyl-, and lauryl-, acrylates.

The following example illustrates more clearly to those skilled in the art the principle and practice of this invention. All parts are by weight unless otherwise indicated.

EXAMPLE 1

| Ingredients | Parts | Range |
|---|---|---|
| Water | 400 | 250–500 |
| Carboxylic monomer (methacrylic acid) | 60 | 55–95 |
| Comonomer (ethylacrylate) | 40 | 45–5 |
| Emulsifiers: | | |
| [Nonylphenoxy(polyethoxy)₈₋₁₆ disodium sulfosuccinate] | 4 | 2–6 |
| [Ammonium lauryl (polyethoxy)₈₋₁₆ sulfate] | 4 | 2–6 |
| Catalyst (potassium persulfate) | .3 | .1–.5 |
| Modifier (t-butyl mercaptan) | .1 | 0–1.0 |
| Temperature, °C | 80 | 70–95 |
| Time, hours | 3½ | 2–10 |

The copolymer of methacrylic acid and ethylacrylate was made by first preparing a soap solution containing 4 parts of the emulsifier in 380 parts of water. To this soap solution in a reaction vessel fitted with a reflux condenser was added a mixture of 60 parts of methacrylic acid and 40 parts of ethylacrylate, the vessel was sealed and evacuated and its contents heated to 80° C. A catalyst solution consisting of .3 part of potassium persulfate in 20 parts of water was prepared and added. The temperature of the reaction was increased from 80° C. to 95° C. at the end of three hours. Reaction proceeded smoothly with the obtainment of substantially 100 percent conversion in 3½ hours. The resulting latex was removed from the reactor and found to be mechanically stable over an indefinite period of time. The latex was also stable to the addition of mineral acids up to 1 part per 100 of latex, organic acids up to 10 parts per 100 of latex, vulcanization agents, antioxidants, and antiozonants, when in a dispersion.

The following table shows results obtained when making a carboxylic latex containing more than 55 percent of a carboxylic monomer when using various monomers and emulsifiers under the same conditions set forth in Example 1 above.

| Example | Emulsifier | Monomer charge A | B | C | Latex Total solids | pH | Mechanical stability |
|---|---|---|---|---|---|---|---|
| 2 | SLPS | MAA 60% | EA 40% | | 21.2 | 3.3 | 10 |
| 3 | DSS | MAA 60% | EA 40% | | 20.9 | 3.6 | 10 |
| 4 | SLPS | AA 60% | EA 40% | | 10.1 | 2.5 | 8 |
| 5 | SDS | MAA 60% | EA 40% | | 21.0 | 3.3 | 0 |
| 6 | SABS | MAA 60% | EA 40% | | 21.0 | 3.3 | 0 |
| 7 | SLS | MAA 60% | EA 40% | | 21.0 | 3.3 | 0 |
| 8 | SABS+NPPEOE | MAA 60% | EA 40% | | 21.0 | 3.3 | 0 |
| 9 | SDHS | MAA 60% | EA 40% | | 21.0 | 3.3 | 0 |
| 10 | TSS | MAA 60% | EA 40% | | 21.0 | 3.3 | 0 |
| 11 | SDDED | MAA 60% | EA 40% | | 21.0 | 3.3 | 0 |
| 12 | SSPE | MAA 60% | EA 40% | | 21.0 | 3.3 | 0 |
| 13 | TLS | MAA 60% | EA 40% | | 21.0 | 3.3 | 0 |
| 14 | SSPC | MAA 60% | EA 40% | | 21.0 | 3.3 | 0 |
| 15 | DSS | MAA 60% | EA 30% | BA 10% | 22.2 | 3.4 | 10 |
| 16 | DSS | MAA 60% | BA 40% | | 20.3 | 3.4 | 10 |
| 17 | SLPS | AA 90% | EA 10% | | 20.4 | 2.8 | 10 |
| 18 | ALPS | MAA 60% | EA 40% | | 24.5 | 3.3 | 10 |

Nomenclature:
Emulsifiers:
SLPS—Sodium lauryl polyethoxy sulfate (10 mols ethylene oxide)
ALPS—Ammonium lauryl polyethoxy sulfate (15 mols ethylene oxide)
DSS—Nonylphenoxy (polyethoxy)$_{10}$ disodium sulfosuccinate
SDS—Sodium dooctyl sulfosuccinate
SABS—Sodium alkyl benzene sulfonate
SLS—Sodium lauryl sulfate
NPPEOE—Nonylphenoxypoly (ethyleneoxy) ethanol (20 mols ethylene oxide)
SDHS—Sodium dihexyl sulfosuccinate
TSS—Tetrasodium N-(1,2-dicarboxyethyl)-N-octodecyl-sulfosuccinamate
SDDED—Sodium dodecyl diphenyl-ether disulfonate
SSPE—Sodium salt of phosphate ester
TLS—Triethanolamine lauryl sulfate
SSPC—Sodium salt of polymeric carboxylic acid
Monomers:
MAA—Methacrylic acid
AA—Acrylic acid
EA—Ethyl acrylate
BA—Butyl acrylate
Stability:
Stability 10—Stable for at least 10 minutes during high sheer stress (Hamilton Beach Stability Test)
Stability 0—Coagulated during the reaction Variation in the ratio of acidic monomer to the non-acidic monomer such as the 2-ethylhexyl acrylate and in making one of the interpolymers affects the balance between the hydrophobic and the hydrophylic properties of the interpolymers. This effect is especially important when the interpolymers are employed as soil release agents in the manufacture of wash-and-wear fabric, particularly when made of cotton and cotton blends where the highly acidic polymeric latex is padded onto the cotton fabric and then heated to cause a reaction between the carboxyl groups of the latex and the hydroxyl groups of the cotton.

In order to make mechanically stable latex of this invention, the reaction must be carried out in aqueous emulsion using the emulsifiers described above. Thus, only those emulsifiers mentioned above work to form the mechanically stable polymeric latices of this invention. Generally the emulsifier forms micelles when present in sufficient concentration, also known as critical micelle concentration. The pollymerization is considered to be initiated by the water soluble initiators at the micelle surface.

The emulsifiers used in the present invention to produce the polymeric latices containing a high concentration of carboxyl groups can be used in amounts sufficient to prevent coagulation of the polymer particles. Generally these emulsifiers are used in an amount between about 1.5 parts and about 10 parts, and generally preferably in an amount between about 2 parts and about 6 parts, and most preferably in an amount of about 4 parts per 100 parts of monomers being polymerized.

Although the catalyst is not critical, numerous ones have been used in carrying out the emulsion polymerization reaction of the present invention using the specific emulsifiers disclosed such as inorganic and organic peroxides and persulfates.

In a preferred form the process is carried out by mixing the monomers together in the desired proportion, mixing water and emulsifier together, and then adding to the mulsifier the monomer mixture to provide an emulsion consisting of the monomer mixture and the emulsifying agent. In the preferred process a persulfate catalyst is also added to the mixture. Further control of the reaction is affected by controlled external cooling and by the addition of further emulsion and a proportionate addition of a reducing agent to continue the reaction at the desired temperature. After the polymerization is completed, the emulsion is stripped of unreacted monomer. The final pH is usually about 3 and may be between 1.5 and 4.5. Additional stabilizers and all protective or other additives may be added to protect the mechanically stable polymeric latex. The latex is now ready for use in textile treatment or for pigmentation to make pigmented paints or any other known use for this class of latex.

While certain representative embodiments and details have been shown for the purpose of illustrating the invention, it will be apparent to those skilled in this art that various changes and modifications may be made therein without departing from the spirit or scope of the invention.

What is claimed is:
1. In a method of making a mechanically stable polymeric latex in an aqueous emulsion by polymerizing at least one alkyl acrylate monomer and at least one carboxylic polymerizable monomer selected from the group consisting of acrylic acid and methacrylic acid present in at least 55 parts to about 95 parts per 100 parts of monomers being polymerized, the improvement being in the use of an ionic emulsifier selected from the group consisting of disodium or diammonium nonylphenoxy polyethoxy sulfosuccinate having the general formula

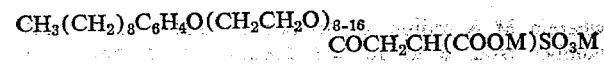

wherein M is sodium or ammonium and a sodium or ammonium lauryl polyethoxy sulfate having the general formula $CH_3(CH_2)_{11}O(CH_2CH_2O)_{8-16}SO_3M$ wherein M is sodium or ammonium.

2. The method of claim 1 wherein the acrylate is ethylacrylate.

3. The method of claim 2 wherein the carboxylic monomer and ethylacrylate are present in a ratio of 60/40.

4. A stable polymeric latex made in accordance with the method of claim 1.

5. The method of claim 1 wherein the emulsifier is the sulfated reaction product of 15 mols of ethylene oxide and 1 mol of lauryl alcohol.

6. A stable polymeric latex made in accordance with the method of claim 5.

References Cited
UNITED STATES PATENTS

| | | | |
|---|---|---|---|
| 3,035,004 | 5/1962 | Glavis | 260—29.7 |
| 3,244,655 | 4/1966 | Sullivan et al. | 260—29.6 |
| 3,317,495 | 5/1967 | Jones et al. | 260—86.3 |
| 3,329,640 | 7/1967 | Scotti et al. | 260—29.6 |
| 3,347,805 | 10/1967 | Scatena et al. | 260—17 |
| 3,361,695 | 1/1968 | Wilhelm et al. | 260—29.6 |
| 3,453,245 | 7/1969 | Glavis | 260—78.5 |

MELVIN GOLDSTEIN, Primary Examiner

U.S. Cl. X.R.

8—120